Nov. 28, 1933.  T. ROBINSON  1,937,169

PRESS DEVICE EMBODYING ELECTRICALLY HEATED ELEMENTS

Filed March 14, 1928  2 Sheets-Sheet 1

INVENTOR
Thomas Robinson
BY
ATTORNEY

Nov. 28, 1933.    T. ROBINSON    1,937,169
PRESS DEVICE EMBODYING ELECTRICALLY HEATED ELEMENTS
Filed March 14, 1928    2 Sheets-Sheet 2
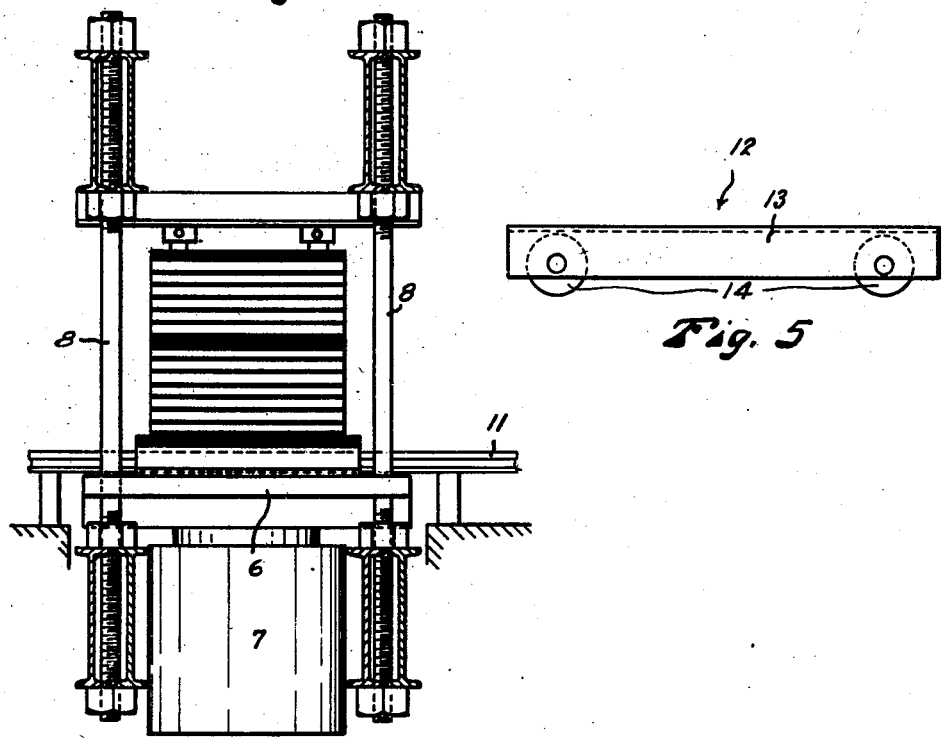
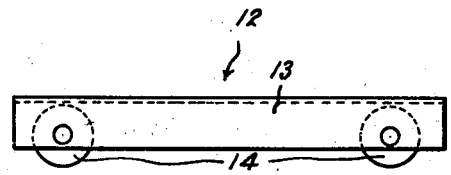
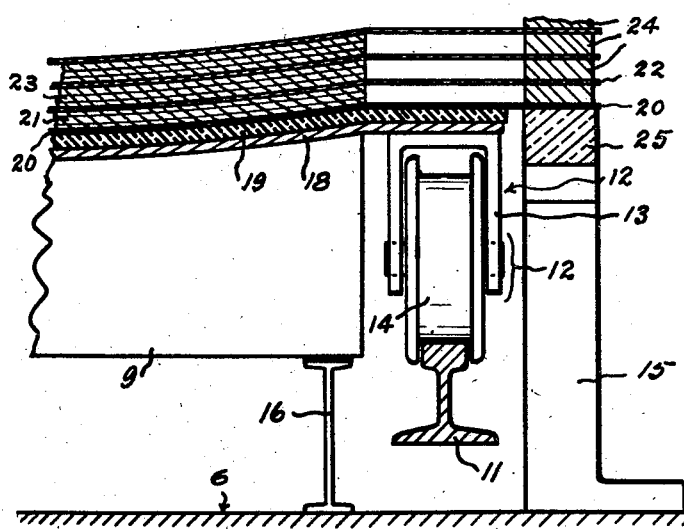
INVENTOR
Thomas Robinson
BY
ATTORNEY Patented Nov. 28, 1933

1,937,169

UNITED STATES PATENT OFFICE 1,937,169

PRESS DEVICE EMBODYING ELECTRICALLY HEATED ELEMENTS

Thomas Robinson, Everett, Wash.

Application March 14, 1928. Serial No. 261,689

11 Claims. (Cl. 144—281)

My invention relates to a press device embodying electrically heated elements, and to the method of manufacturing laminated products.

For purposes of clearness, accuracy and definiteness of description, I will set forth my invention as applied to the manufacture of veneer, laminated or plywood products, where it is desired to apply heat to the materials being treated while under pressure. However, while my invention is thus set forth with reference to a specific application, it is not to be considered as limited thereto as it is intended to cover all applications involving similar conditions and problems, whatever the particular character of the product may be.

In manufacturing laminated or plywood products, there are two processes commonly employed, the cold process and the hot-plate process. In the cold process, it is customary to take the individual sheet of veneer and supply it with a coating or adhesive and then build up the particular plywood structure desired, whether it be two or more ply. These various plywood units thus formed are loaded on trucks, being piled one on top of the other to form a stack or what is known as a "pressing". The pressing is then supplied to the press and the desired pressure applied. While the pressure is still applied, clamps are secured in position to retain the pressure imparted by the press after removal therefrom. The pressure imparted during the pressing operation is thus retained upon the units even after withdrawal from the press. The pressing is then left with the clamping means attached for not less than twelve hours.

In manufacturing some plywood units, in distinction to the above the hot-plate process is employed. The pressing device for carrying out this process is supplied with steam heated elements which are automatically held in spaced relation before the press is loaded and each plywood unit must be brought to the press and inserted between the heating elements. Then, when the press is fully loaded, the pressure is applied and the various heating elements are forced tightly together. These steam heated elements are of heavy armor steel plate construction about two inches in thickness. Each element is drilled to provide the steam space. Obviously, such plates are exceedingly expensive. They are shaped to a definite form and thereby serve as dies to shape the plywood structure to the form given to the steam heated member. Serious objection obtains to this form of press in addition to its great cost in that it is of a fixed form, i. e., it requires a different set of heating members for each particular form of plywood unit desired. Also, the mode of operation involves a very low volume production in that each plywood unit must be brought from the assembling point and supplied to the press individually, thereby keeping the press waiting until the press is filled. The plywood units themselves may be only about three-sixteenths of an inch ($\frac{3}{16}$") to one-half inch ($\frac{1}{2}$") as a common range of thickness, and, obviously, in view of the two-inch thickness of the heating elements the volume of a heating press of the common practice design is very much reduced. The space between the press platform and the abutment member is largely consumed by the thickness of the steam heating elements. After the press is loaded and the pressing and heating operation completed, there is involved the removal individually of the plywood units,—another great time-consuming operation.

A primary object of my invention is to provide a press of the character described which utilizes a very thin heating member and one in which the pressings are all prepared at the point of applying the adhesive, i. e., at the glue spreader, and the heating members or platens are likewise inserted at the glue spreader, then loaded bodily or en masse into the press, and the proper pressure applied, together with the necessary heating, until the glue is set, which involves about ten minutes. Then the entire pressing is bodily removed from the press, leaving the press available for immediately being reloaded. Thereby my device provides for a single handling in supplying the press with some seventy panels or plywood units, (the number depending upon the thickness of the units and the press opening), whereas in the case of the steam heated element of the hot plate device the number of panels of similar thickness and press opening is only about twelve panels.

An important advantage in heating at the time of applying the pressure is the very superior product that results: First, it has been shown that such a product is characterized by a greater water-resisting character on the part of the adhesive. Also, there is a less distortion in the panels, i. e., they come out in a more uniformly straight character than under the aforesaid cold process method of treatment. Furthermore, for some purposes it is fundamentally important to employ blood albumen adhesive which positively requires the application of heat while setting. The same is true to a degree when casein is the adhesive employed.

A further object of my invention is to provide a device of the character described which utilizes a heating element, which in conjunction with a separate die member may assume different forms in successive applications.

The above mentioned general objects of my invention, together with others inherent in the same, are attained by the device illustrated in the following drawings, the same being a preferred exemplary form of embodiment of my invention, throughout which drawings like reference numerals indicate like parts:

Fig. 3 is an end view of said device;

Fig. 4 is an enlarged fragmentary view of said device; and

Fig. 5 is a side view of a truck used in connection with my device.

Figure 2:
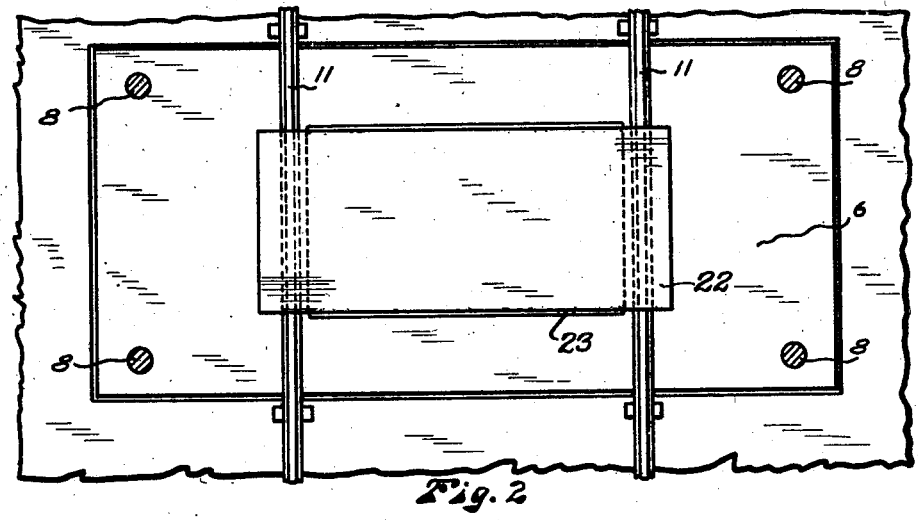
Fig. 2 is a view on dotted line 2, 2 of Fig. 1.

A press platform 6 having hydraulic or other pressure producing means 7 is slidably mounted on guides 8. A press bed 9 is mounted on I beams 16 on the press platform 6. The particular press bed shown is provided with a concave surface having a curvature required for forming laminated wood bows to be used in automobile tops. Obviously, the form of this press bed may be straight, i. e., flat, or any other particular form required, its function being that of a die. Operatively disposed above the press bed 9 by I beams 17 is the abutment 10 which has a convex curvature corresponding to the degree of curvature of the press bed 9. Extending across the press platform are two rails 11, said rails being adjacent to the end of the press bed 9. On these rails two wheeled trucks 12 run, which trucks have the frame 13 extending above the wheels 14. Adjacent to the rails 11 are disposed base means 15. At the time of loading the trucks a separate floor member 18 of sheet metal is placed upon the trucks 12 to form a platform thereacross. Upon said floor member 18 a sheet of insulating material 19 is next placed and upon this a platen heating member 20 is positioned. Upon this heating member 20, the veneer panel or unit 21 is placed. This is done at the glue spreader (not shown herein) as soon as the veneer panel or unit is assembled. Thereupon another platen 22 is placed upon veneer unit 21 and another veneer panel 23 is placed upon the platen heating member 22, and so on, until the desired number of units is assembled and positioned to form the stack or pressing. The said veneer panels or units are slightly wider than the platen heating elements to prevent the wet adhesive pressed out from the edges of the panel from contacting the platen heating elements. As respects the ends of the panel, the adhesive is kept back by means of the cross filler in the panel. The platen heating elements are longer for purposes which are hereinafter set forth.

Figure 1:
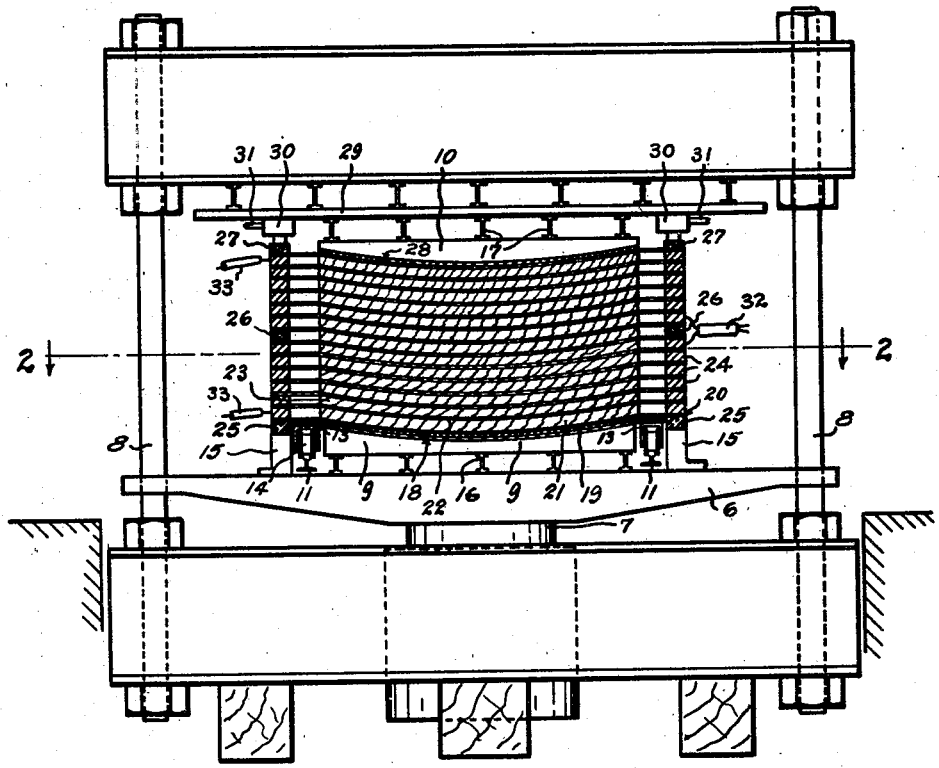
Figure 1 is a view in side elevation of a press and a pressing of laminated products embodying my invention.

The trucks with the charge for the press are then pushed to the press herein set forth. The trucks with their load are positioned on the rails 11 directly above the platform 6. Thereupon, electric conductor blocks 24 are placed between the end portions of each platen heating member or element with the exception of those platens where, as shown in Fig. 1, insulating blocks 25, 26 and 27 are inserted. These blocks may be formed integral with the platen heating elements. The insulating blocks 25 are placed upon the base means 15. Thus, the purpose of having the platens longer than the veneer panels or units is manifest, that is, so that the blocks 24 may be inserted even though the said blocks are not of the same thickness as the veneer units, and so that the space between the extending end portions of the platens may be varied to position the blocks 24 therebetween, despite any discrepancy in the thickness of the veneer units and the blocks 24. Insulating blocks 26 are located intermediate the height of the pile and insulating blocks 27 are located on top of the topmost platen. A sheet 28 of insulating material is secured to the underside of the abutment member 10. Secured to the top frame member 29 of the press are suitable pressure producing means 30. These may be compressed air means having inlet pipes 31 or any other suitable pressure means. These are positioned so as to exert a pressure upon the column of electric conductor blocks 24 with their interposed insulating means, whereby the ends of the platen heating members or elements are firmly pressed together. Suitable electric conductor means 32 and 33 are connected to the conductor blocks to cause an electric current to flow through the platen heating members to cause the same to become heated by the electrical resistance of said heating members,—a three phase circuit being herein illustrated.

The mode of operation of a device embodying my invention is as follows:

After positioning the charge for the press over the platform and the electric conductor blocks 24 are positioned and the electric conductors 32 and 33 connected thereto, the platform 6 is raised until the press bed 9 contacts with floor member 18 and lifts the load off the trucks 12. Sufficient clearance is left between the rails 11 and the top of the press platform to permit the necessary movement of the platform upwardly to apply the necessary pressure to the charge for the press before the platform contacts the rails 11. Thereupon, the pressure means 30 is operated to apply the required pressure to the electric conductor blocks to establish close contact between the said blocks and the interposed end portions of the platen heating members. Thereupon, electric current is applied and the platen heating members are caused to become heated and through them the veneer panels or units are heated. The heating operation is continued in the press for such period of time, i. e., five to ten minutes, as may be required to cause the glue to firmly set. The insulating means 25 and 27 prevent the escape of the current from the platens, and the insulating sheets 28 and 19 prevent the escape of the current through the bed 9 and abutment 10.

Having completed the pressing and heating operation, the pressure exerted by the hydraulic means 7 is removed and the press platform is lowered to permit the trucks again to assume the weight of the load. Thereupon, the electric conductor blocks and conductors are removed and the load is shoved off the press and another pressing immediately supplied. Thus, it will be observed that by this method of manufacture provision is made for a large volume production, there being no separate loading individually of the veneer panels to the heating members in the press with the consequent holding up of press operations until the load is formed, and when the pressing and heating operation is concluded the entire load is removed en masse and the individual and separate removal of each panel is avoided with consequent holding up of the press. A sufficient number of platen heating members are provided to meet the requirements of the above described method of operation.

Obviously, changes may be made in the form, dimensions, and arrangement of the parts of my invention, without departing from the principle thereof, the above setting forth only a preferred form of embodiment.

I claim:

1. A press of the character described embodying a press platform bed and an abutment member; means whereby said platform may be actuated toward said abutment member; a floor member; a plurality of electrically heated platens with material to be treated interposed between said platens; a plurality of electric conductor blocks interposed between the ends of said platens; insulating blocks disposed upon the end portions of the top platen and under the end portions of the bottom platen and intermediate the column of said conductor blocks whereby electric current may be directed through specific platens; and electrical conductors operatively connected to said blocks, whereby electric current may be supplied to said blocks and through said blocks to said platens.

2. A press of the character described embodying a press platform bed and an abutment member; means whereby said platform may be actuated toward said abutment member; a floor member; a plurality of electrically heated platens with material to be treated interposed between said platens; a plurality of electric conductor blocks interposed between the ends of said platens; insulating blocks disposed upon the end portions of the top platen and under the end portions of the bottom platen and intermediate the column of said conductor blocks whereby electric current may be directed through specific platens; means whereby said blocks may be pressed together; and electrical conductors operatively connected to said blocks; whereby electric current may be supplied to said blocks and through said blocks to said platens.

3. A press of the character described embodying a press platform bed and an abutment member; means whereby said platform may be actuated toward said abutment member; a floor member; an insulating sheet disposed upon said floor member; a second insulating sheet disposed upon the face of said abutment member; a plurality of electrically heated platens with material to be treated interposed between said platens; a plurality of electric conductor blocks interposed between the ends of said platens; insulating blocks disposed upon the end portions of the top platen and under the end portions of the bottom platen and intermediate the column of said conductor blocks whereby electric current may be directed through specific platens; means whereby said blocks may be pressed together; and electrical conductors operatively connected to said blocks, whereby electric current may be supplied to said blocks and through said blocks to said platens.

4. A press of the character described embodying a press platform bed and an abutment member; means whereby said platform may be actuated towards said abutment member; a floor member; a plurality of electrically heated platens with material to be treated interposed between said platens, said platens having their end portions extend beyond the length of said material being treated; a plurality of electric conductor blocks interposed between the ends of said platens and disposed in spaced relation to the ends of the material being treated, whereby discrepancies in the thickness of the layers of the material being treated may be compensated; insulating blocks disposed upon the end portions of the top platen and under the end portions of the bottom platen and intermediate the column of said conductor blocks whereby electric current may be directed through specific platens; and electrical conductors operatively connected to said blocks, whereby electric current may be supplied to said blocks and through said blocks to said platens.

5. A press of the character described embodying a press platform bed and an abutment member; means whereby said platform may be actuated toward said abutment member; a floor member; a plurality of electrically heated platens with material to be treated interposed between said platens; a plurality of electric conductor blocks interposed between the ends of said platens; insulating blocks disposed upon the end portions of the top platen and under the end portions of the bottom platen and intermediate the column of said conductor blocks whereby electric current may be directed through specific platens; an electrically insulated support for said blocks; and electrical conductors operatively connected to said blocks, whereby electric current may be supplied to said blocks and through said blocks to said platens.

6. A press of the character described embodying a press bed and an abutment member; means whereby said bed may be actuated toward said abutment member; a plurality of electrically heated platens with material to be treated interposed between said platens, said platens having their end portions extended beyond the edge of said material being treated; a plurality of electric conductor blocks interposed between the ends of said platens; means whereby said blocks may be pressed together; and electric conductors connected to said conductor blocks whereby electric current may be supplied to said blocks and through said blocks to said platens.

7. In a press of the character described, the combination of a plurality of electrically heated platens with material to be treated interposed between said platens, said platens having their end portions extended beyond the edge of said material being treated; and a plurality of electric conductor blocks interposed between the ends of said platens.

8. In a press of the character described, the combination of a plurality of electrically heated platens, with material to be treated interposed between said platens, said platens having their end portions extended beyond the edge of said material being treated; and a plurality of electric conductor blocks interposed between the ends of said platens and disposed in spaced relation to the edges of the material being treated, whereby discrepancies in thickness of the layers of the material being treated may be compensated.

9. In a press of the character described, the combination of a plurality of electrically heated platens, with material to be treated interposed between said platens, said platens having their end portions extended beyond the edge of said material being treated; a plurality of electric conductor blocks interposed between the ends of said platens and disposed in spaced relation to the edges of the material being treated, whereby discrepancies in thickness of the layers of the material being treated may be compensated; and means whereby said conductor blocks may be pressed together.

10. A press of the character described embodying a press platform bed and an abutment member; means whereby said platform may be actuated towards said abutment member; a floor member; a plurality of electrically heated platens with material to be treated interposed between said platens, said platens having their end portions extend beyond the edges of said material being treated; a plurality of electric conductor blocks interposed between the ends of said platens and disposed in spaced relation to the edges of the material being treated, whereby discrepancies in the thickness of the layers of the material being treated may be compensated; and electrical conductors operatively connected to said blocks, whereby electric current may be supplied to said blocks and through said blocks to said platens.

11. A charge for a press of the class described, comprising a plurality of sheets of plywood and electrical heating platens disposed therebetween, said electrical heating platens consisting of a continuous pliable solid metal sheet forming an uninsulated electrical heating elements, which element is successively deformable in different shapes as different dies are used to make plywood, and which element will withstand plywood-pressures without being compressed thereby.

THOMAS ROBINSON.